(12) United States Patent
Sadamitsu

(10) Patent No.: US 11,454,152 B2
(45) Date of Patent: Sep. 27, 2022

(54) ELECTRICALLY HEATED CATALYST DEVICE

(71) Applicant: TOYOTA JIDOSHA KABUSHIKI KAISHA, Aichi-ken (JP)

(72) Inventor: Takahiro Sadamitsu, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/324,104

(22) Filed: May 19, 2021

(65) Prior Publication Data
US 2021/0372311 A1 Dec. 2, 2021

(30) Foreign Application Priority Data
Jun. 2, 2020 (JP) .............................. JP2020-096255

(51) Int. Cl.
*F01N 3/20* (2006.01)
*F01N 3/28* (2006.01)
(Continued)

(52) U.S. Cl.
CPC ........... *F01N 3/2013* (2013.01); *B01D 53/94* (2013.01); *B01J 23/42* (2013.01); *B01J 23/44* (2013.01); *B01J 23/464* (2013.01); *B01J 35/0033* (2013.01); *B01J 35/04* (2013.01); *F01N 3/2803* (2013.01); *F01N 3/2839* (2013.01);
(Continued)

(58) Field of Classification Search
CPC ........ F01N 3/2013; F01N 3/2803; F01N 3/00; F01N 3/0222; F01N 3/027; F01N 3/2006; F01N 3/24; F01N 3/2026; F01N 3/2882; F01N 3/0814; F01N 3/101; F01N 9/00; F01N 2240/16; B01D 53/94; B01D 2255/1021; B01D 2255/1023; B01D 2255/1025; B01D 2255/9155; B01J 23/42; B01J 23/44; B01J 23/464; B01J 35/0033; B01J 35/04; Y02T 10/12; Y02T 10/40
See application file for complete search history.

(56) References Cited

U.S. PATENT DOCUMENTS 5,554,342 A * 9/1996 Hirayama ............... F01N 3/281
422/174
9,845,714 B2 * 12/2017 Mori ...................... F01N 3/2013
(Continued)

FOREIGN PATENT DOCUMENTS

JP 2019209245 A 12/2019
WO 2012108002 A1 8/2012

*Primary Examiner* — Audrey B. Walter
*Assistant Examiner* — Dapinder Singh
(74) *Attorney, Agent, or Firm* — Hauptman Ham, LLP

(57) ABSTRACT

An electrically heated catalyst device includes a catalyst support, a low-potential-side electrode, and a high-potential-side electrode. In a case in which a current value between two electrodes, which are the low-potential-side electrode and the high-potential-side electrode, is gradually increased from 0, the current value between the two electrodes is referred to as an electrode fusing current value when, in each of the low-potential-side electrode and the high-potential-side electrode, a temperature of any section of the electrode first reaches a melting point of a material of the electrode. The low-potential-side electrode is configured to have a lower electrode fusing current value than the high-potential-side electrode.

6 Claims, 7 Drawing Sheets

(51) Int. Cl.
*B01D 53/94* (2006.01)
*B01J 35/00* (2006.01)
*B01J 23/42* (2006.01)
*B01J 35/04* (2006.01)
*B01J 23/44* (2006.01)
*B01J 23/46* (2006.01)

(52) U.S. Cl.
CPC ............... *B01D 2255/1021* (2013.01); *B01D 2255/1023* (2013.01); *B01D 2255/1025* (2013.01); *B01D 2255/9155* (2013.01)

(56) References Cited

U.S. PATENT DOCUMENTS

| | | | |
|---|---|---|---|
| 10,071,343 B2* | 9/2018 | Nakayama | F01N 3/2853 |
| 10,570,794 B2* | 2/2020 | Mori | H05B 3/34 |
| 10,731,534 B2* | 8/2020 | Stiglmair | F01N 3/2026 |
| 2011/0305601 A1* | 12/2011 | Kawase | F01N 3/2026 |
| | | | 422/109 |
| 2013/0312393 A1 | 11/2013 | Yoshioka | |
| 2014/0072477 A1* | 3/2014 | Gonze | F01N 3/043 |
| | | | 422/177 |
| 2019/0368403 A1 | 12/2019 | Mori et al. | |

* cited by examiner

ELECTRICALLY HEATED CATALYST DEVICE

RELATED APPLICATIONS

The present application claims priority of Japanese Application Number 2020-096255, filed on Jun. 2, 2020, the disclosure of which is hereby incorporated by reference herein in its entirety.

BACKGROUND

1. Field

The present disclosure relates to an electrically heated catalyst device.

2. Description of Related Art

As an exhaust gas purifying catalyst device for an internal combustion engine, Japanese Laid-Open Patent Publication No. 2019-209245 discloses an electrically heated catalyst device. The electrically heated catalyst device disclosed in the above publication includes a catalyst support, which is arranged inside an exhaust pipe and made of an electroconductive material, and two electrodes fixed to the outer circumferential surface of the catalyst support.

When an excessive current flows between the electrodes of the electrically heated catalyst device, Joule heat melts the electrodes, so that part of the electrodes may separate from the catalyst support. The separated part of the electrodes may contact the exhaust pipe, which may cause current leakage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electrically heated catalyst device purifies exhaust gas of an internal combustion engine mounted on a vehicle. The device includes a catalyst support, a low-potential-side electrode, and a high-potential-side electrode. The catalyst support is arranged inside an exhaust pipe of the internal combustion engine, and is made of an electroconductive material. The low-potential-side electrode is fixed to an outer circumferential surface of the catalyst support, and is configured to be connected to a low-potential-side terminal of a vehicle on-board power source when the electrically heated catalyst device is assembled with the vehicle. The high-potential-side electrode is fixed to the outer circumferential surface of the catalyst support, and is configured to be connected to a high-potential-side terminal of the vehicle on-board power source when the electrically heated catalyst device is assembled with the internal combustion engine. In a case in which a current value between two electrodes, which are the low-potential-side electrode and the high-potential-side electrode, is gradually increased from 0, the current value between the two electrodes is referred to as an electrode fusing current value when, in each of the low-potential-side electrode and the high-potential-side electrode, a temperature of any section of the electrode first reaches a melting point of a material of the electrode. The low-potential-side electrode is configured to have a lower electrode fusing current value than the high-potential-side electrode.

In the above-described electrically heated catalyst device assembled with the internal combustion engine, when an excessive current flows between the two electrodes, Joule heat melts and breaks the electrodes, so that the flow of current is interrupted. At this time, between the low-potential-side electrode and the high-potential-side electrode of the electrically heated catalyst device, the low-potential-side electrode, of which the electrode fusing current value is lower, is more likely to be melted and broken. The potential of the low-potential-side electrode is substantially the same as the potential of the exhaust pipe, which is part of the vehicle body. Thus, even if the low-potential-side electrode entirely or partially separates from the catalyst support and contacts the exhaust pipe due to melting and breaking, current leakage to the exhaust pipe does not occur. Therefore, the above-described electrically heated catalyst device reduces the risk of occurrence of current leakage when an excessive current flows between the electrodes and the electrodes are melted and broken.

In the above-described electrically heated catalyst device, each of the low-potential-side electrode and the high-potential-side electrode includes, in some cases, a comblike electrode layer that includes wiring portions extending parallel with each other, a film-shaped surface electrode layer, which is arranged between the wiring portions of the comblike electrode layer and the outer circumferential surface of the catalyst support, and a fixing layer fixed to a surface of the surface electrode layer with the wiring portions in between. In this case, the electrode fusing current value at the low-potential-side electrode can be made lower than that at the high-potential-side electrode by configuring the low-potential-side electrode and the high-potential-side electrode as described in the following items (1) to (5).

(1) The surface electrode layer of the low-potential-side electrode is configured such that the contact area with the outer circumferential surface of the catalyst support is smaller than that of the surface electrode layer of the high-potential-side electrode.

(2) The surface electrode layer of the low-potential-side electrode is made of a material having a higher volume resistivity than a material of the surface electrode layer of the high-potential-side electrode.

(3) A number of the wiring portions provided in the comblike electrode layer of the low-potential-side electrode is smaller than a number of the wiring portions provided in the comblike electrode layer of the high-potential-side electrode.

(4) Each wiring portion in the comblike electrode layer of the low-potential-side electrode has a smaller area in a cross section perpendicular to an extending direction than that of each wiring portion in the comblike electrode layer of the high-potential-side electrode.

(5) A number of the fixing layers provided in the low-potential-side electrode is smaller than a number of the fixing layers provided in the high-potential-side electrode.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

An electrically heated catalyst device 10 according to a first embodiment will now be described with reference to FIGS. 1 and 2.

Figure 1:
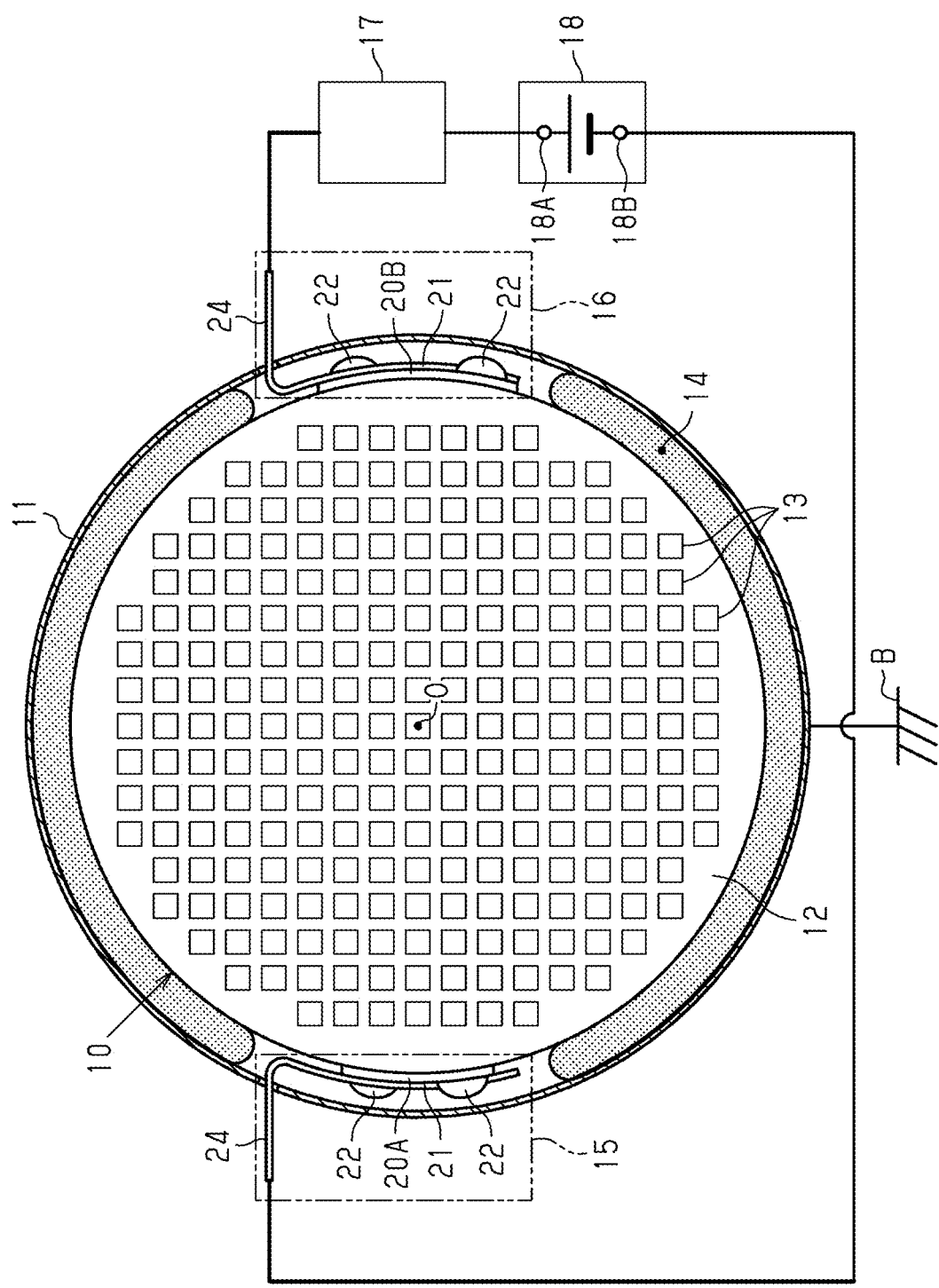
FIG. 1 is a diagram showing a manner in which an electrically heated catalyst device according to a first embodiment is assembled with an internal combustion engine.
Figure 2:
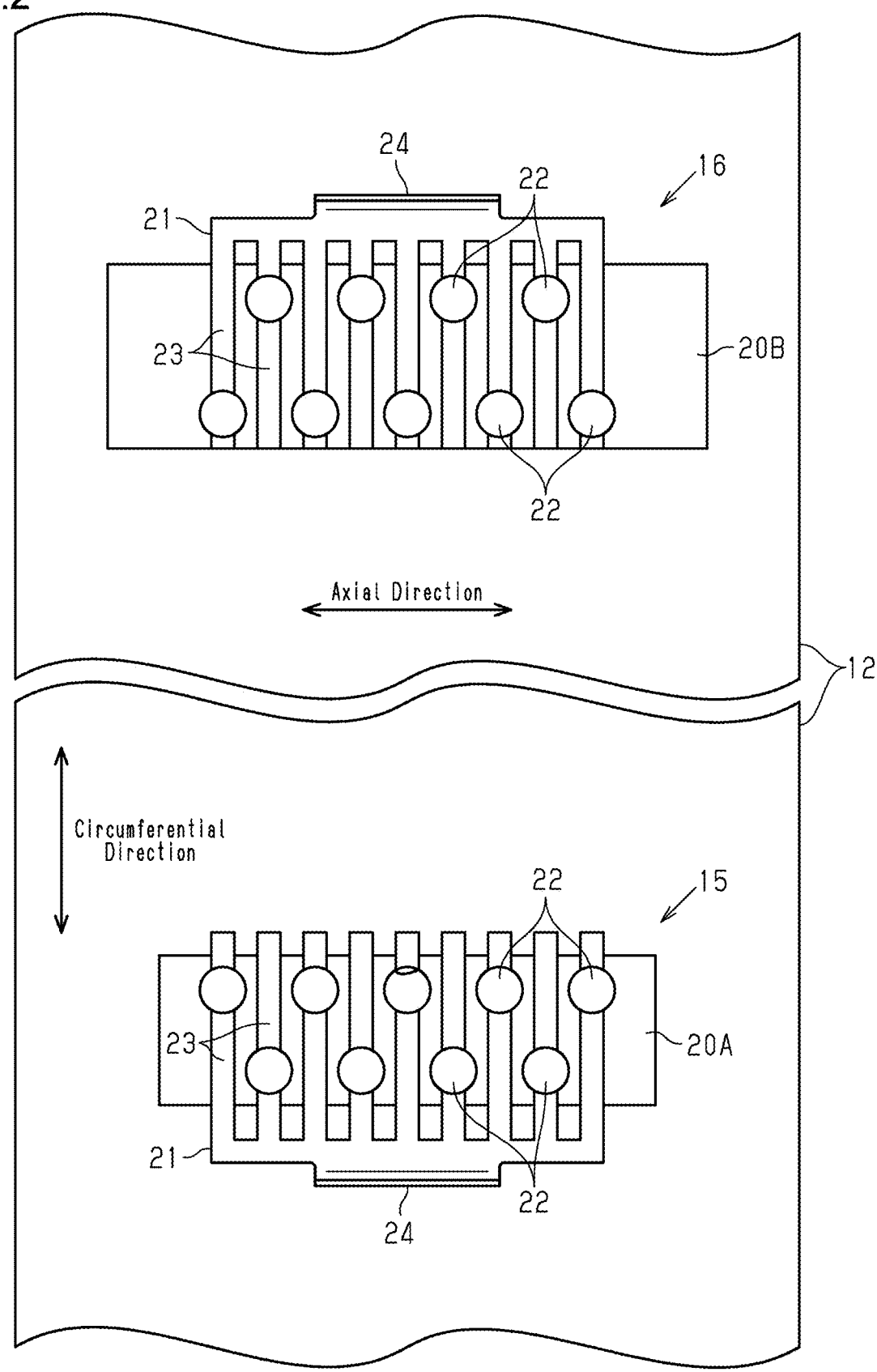
FIG. 2 is a developed view of the outer circumferential surface of the electrically heated catalyst device according to the first embodiment.

As shown in FIG. 1, the electrically heated catalyst device 10 includes a catalyst support 12 installed inside an exhaust pipe 11 of an internal combustion engine mounted on a vehicle. The catalyst support 12 is made of a porous electroconductive material and has a columnar outer shape. In the following description, a direction that is parallel with a column center line O of the cylindrical catalyst support 12 will be referred to as an axial direction of the catalyst support 12. Also, in the following description, an orbiting direction about the column center line O will be referred to as a circumferential direction of the catalyst support 12, and a direction orthogonal to the column center line O will be referred to as a radial direction of the catalyst support 12.

The catalyst support 12 is made of composite ceramics, for example, of silicon carbide particles and silicon particles. The catalyst support 12 incorporates a honeycomb structure with a great number of fine pores 13, which extend in the axial direction. The inner walls of the fine pores 13 support catalyst such as platinum, palladium, or rhodium. A spacer 14 made of an insulating material is placed in the gap between the inner wall of the exhaust pipe 11 and the outer circumference of the catalyst support 12. The spacer 14 insulates the exhaust pipe 11 from the catalyst support 12.

The electrically heated catalyst device 10 further includes two electrodes, which are a low-potential-side electrode 15 and a high-potential-side electrode 16 arranged on the outer circumference of the catalyst support 12. The high-potential-side electrode 16 and the low-potential-side electrode 15 are located at symmetrical positions with respect to the column center line O of the catalyst support 12. When the electrically heated catalyst device 10 is assembled with a vehicle, the low-potential-side electrode 15 is connected to a low-potential-side terminal 18B of a vehicle on-board power source 18. When the electrically heated catalyst device 10 is assembled with a vehicle, the high-potential-side electrode 16 is connected to a high-potential-side terminal 18A of the vehicle on-board power source 18 via a controller 17. The controller 17 is configured to control current supplied to the catalyst support 12 of the electrically heated catalyst device 10.

In the internal combustion engine equipped with the electrically heated catalyst device 10, the catalyst supported by the catalyst support 12 purifies hazardous constituents in exhaust gas. Immediately after the internal combustion engine is started, the temperature of the catalyst support 12 is low, and the catalyst is inactive. During no- or low-load operation of the internal combustion engine, the temperature of exhaust gas flowing in the exhaust pipe 11 is low. If this state continues, the temperature of the catalyst support 12 is lowered, so that the catalyst may become inactive. Accordingly, immediately after the internal combustion engine is started or during no- or low-load operation of the internal combustion engine, the controller 17 supplies current to the catalyst support 12 from the vehicle on-board power source 18, so that Joule heat generated by the current heats the catalyst support 12 to promote activation of the catalyst.

Next, the detailed configuration of the low-potential-side electrode 15 and the high-potential-side electrode 16 provided in the electrically heated catalyst device 10 of the present embodiment will be described with reference to FIG. 2. FIG. 2 is a developed view of the outer circumferential surface of the electrically heated catalyst device 10. The low-potential-side electrode 15 includes a surface electrode layer 20A, a comblike electrode layer 21, and fixing layers 22. The high-potential-side electrode 16 includes a surface electrode layer 20B, a comblike electrode layer 21, and fixing layers 22.

The surface electrode layers 20A, 20B are films of porous metal, which are formed on the outer circumferential surface of the catalyst support 12 through thermal spraying. The surface electrode layers 20A, 20B are made of a metal having a high oxidation resistance at high temperatures, such as a nichrome chromium alloy. The surface electrode layers 20A, 20B in the electrically heated catalyst device 10 according to the present embodiment have rectangular shapes with long sides extending in the axial direction of the catalyst support 12 and short sides extending in the circumferential direction.

Each comblike electrode layer 21 is a metal thin plate made of a heat-resistant alloy, which is, for example, a ferritic-iron-chromium-aluminum alloy with added yttrium (FeCrAlY alloy). In the present embodiment, the metal that is used for the comblike electrode layer 21 is a metal having a melting point that is higher than that of the metal used for the surface electrode layers 20A, 20B. The comblike electrode layers 21 include wiring portions 23 on the surfaces of the surface electrode layers 20A, 20B. The wiring portions 23 are arranged in the axial direction of the catalyst support 12. That is, the surface electrode layers 20A, 20B are arranged between the wiring portions 23 of the comblike electrode layer 21 and the outer circumferential surface of the catalyst support 12. The metal plate forming the comblike electrode layer 21 includes a terminal portion 24, which is connected to the wiring portions 23. When the electrically heated catalyst device 10 is assembled with the internal combustion engine, the terminal portions 24 are connected to external wires.

The comblike electrode layers 21 are fixed to the surface electrode layers 20A, 20B by the fixing layers 22. The fixing layers 22 are films made of a porous metal that are formed on the surfaces of the wiring portions 23 of the comblike electrode layers 21 and the surface electrode layers 20A, 20B through thermal spraying. The fixing layers 22 are made of a metal having a high oxidation resistance at high temperatures, such as a nichrome chromium alloy. The fixing layers 22 of the low-potential-side electrode 15 and the high-potential-side electrode 16 are scattered on the surfaces of the wiring portions 23 of the comblike electrode layers 21 and the surface electrode layers 20A, 20B. The fixing layers 22 are fixed to the surfaces of the surface electrode layers 20A, 20B with the wiring portions 23 of the comblike electrode layers 21 in between. Accordingly, the metal thin plate forming the comblike electrode layers 21 are fixed to the surfaces of the surface electrode layers 20A, 20B.

In the electrically heated catalyst device 10 of the present embodiment, the comblike electrode layers 21 of the low-potential-side electrode 15 and the high-potential-side electrode 16 have the same shapes and dimensions, and are made of the same material. Also, the number, the positions, and the size of the fixing layers 22 are the same between the low-potential-side electrode 15 and the high-potential-side electrode 16. However, the short sides and the long sides of the surface electrode layer 20A of the low-potential-side electrode 15 are shorter than those of the surface electrode layer 20B of the high-potential-side electrode 16. Accordingly, the contact area of the surface electrode layer 20A of the low-potential-side electrode 15 with the outer circumferential surface of the catalyst support 12 is set to be smaller than the contact area of the surface electrode layer 20B of the high-potential-side electrode 16.

An operation and advantages of the present embodiment will now be described.

In the electrically heated catalyst device 10 of the present embodiment, which has the above-described configuration, when an excessive current flows between the low-potential-side electrode 15 and the high-potential-side electrode 16, for example, due to an abnormal operation of the controller 17, Joule heat may melt and break one of the electrodes. If one of the low-potential-side electrode 15 and the high-potential-side electrode 16 is melted and broken, the flow of current is interrupted. In the electrically heated catalyst device 10 of the present embodiment, the surface electrode layer 20A of the low-potential-side electrode 15 is configured such that the contact area with the outer circumferential surface of the catalyst support 12 is smaller than that of the surface electrode layer 20B of the high-potential-side electrode 16. Accordingly, when current flows between the two electrodes, the current density in the surface electrode layer 20A of the low-potential-side electrode 15 is higher than that in the surface electrode layer 20B of the high-potential-side electrode 16. Also, the Joule heat generated in the surface electrode layer 20A of the low-potential-side electrode 15 is greater than the Joule heat generated in the surface electrode layer 20B of the high-potential-side electrode 16. Therefore, between the low-potential-side electrode 15 and the high-potential-side electrode 16, the low-potential-side electrode 15 is more likely to be melted and broken when an excessive current flows between the two electrodes.

If the high-potential-side electrode 16 is melted and broken, so that it partially or entirely separates from the catalyst support 12 and contacts the exhaust pipe 11, current may flow to the exhaust pipe 11 through the separated part of the high-potential-side electrode 16. On the other hand, the low-potential-side electrode 15 is connected to the low-potential-side terminal 18B of the vehicle on-board power source 18, and the potential of the low-potential-side electrode 15 is substantially the same as the potential of the exhaust pipe 11, which forms a part of a vehicle body B. Thus, even if the low-potential-side electrode 15 entirely or partially separates from the catalyst support 12 due to melting and breaking, so as to contact the exhaust pipe 11, current leakage to the exhaust pipe 11 does not occur. Therefore, the electrically heated catalyst device 10 of the present embodiment reduces the risk of occurrence of current leakage when an excessive current flows between the electrodes and the electrodes are melted and broken.

Second Embodiment

An electrically heated catalyst device according to a second embodiment will now be described with reference to FIG. 3. In the present embodiment and each of the following embodiments, the structures common to those of the first embodiment are identified by the same reference numbers and will not be described in detail. The electrically heated catalyst device of the present embodiment has the same configuration as that of the first embodiment except for the surface electrode layers 20C, 20D of the low-potential-side electrode 15 and the high-potential-side electrode 16.

Figure 3:
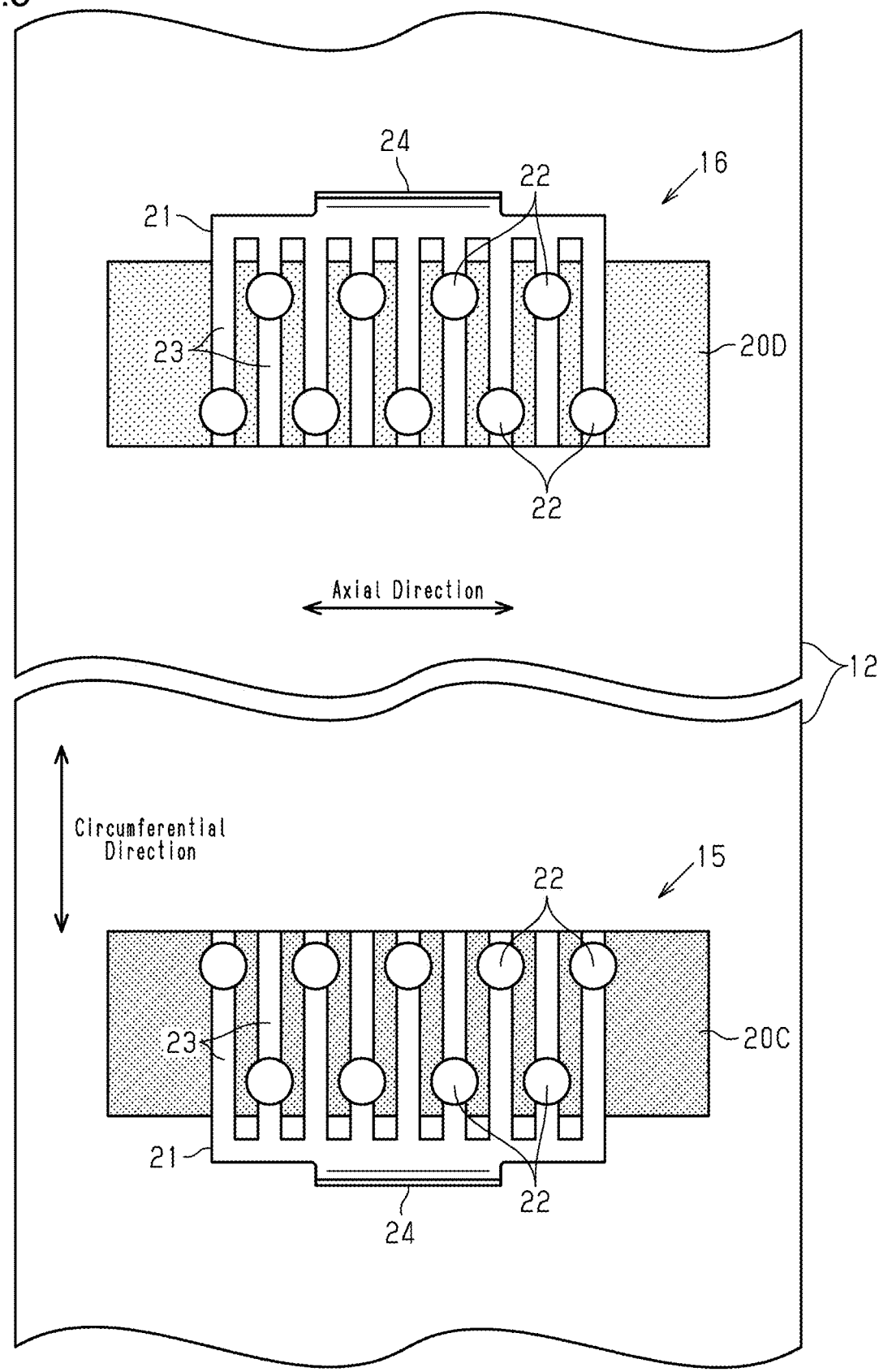
FIG. 3 is a developed view of the outer circumferential surface of an electrically heated catalyst device according to a second embodiment.

FIG. 3 is a developed view of the outer circumferential surface of the electrically heated catalyst device according to the present embodiment. In the electrically heated catalyst device of the present embodiment, the surface electrode layers 20C, 20D of the low-potential-side electrode 15 and the high-potential-side electrode 16 have the same dimensions and shape. However, the surface electrode layer 20C of the low-potential-side electrode 15 is made of a material having a higher volume resistivity than the material of the surface electrode layer 20D of the high-potential-side electrode 16. Accordingly, the surface electrode layer 20C of the low-potential-side electrode 15 has a higher electric resistance value than the surface electrode layer 20D of the high-potential-side electrode 16.

In the electrically heated catalyst device of the present embodiment, when current flows between the low-potential-side electrode 15 and the high-potential-side electrode 16, the Joule heat generated at the surface electrode layer 20C of the low-potential-side electrode 15 is greater than the Joule heat generated at the surface electrode layer 20D of the high-potential-side electrode 16, which has a lower electric resistance value than the surface electrode layer 20C. Thus, even in the electrically heated catalyst device of the present embodiment, the low-potential-side electrode 15 is more likely to be melted and broken before the high-potential-side electrode 16 when an excessive current flows between the two electrodes. Therefore, the electrically heated catalyst device of the present embodiment also reduces the risk of occurrence of current leakage when an excessive current flows between the electrodes and the electrodes are melted and broken.

Third Embodiment

An electrically heated catalyst device according to a third embodiment will now be described with reference to FIG. 4.

Figure 4:
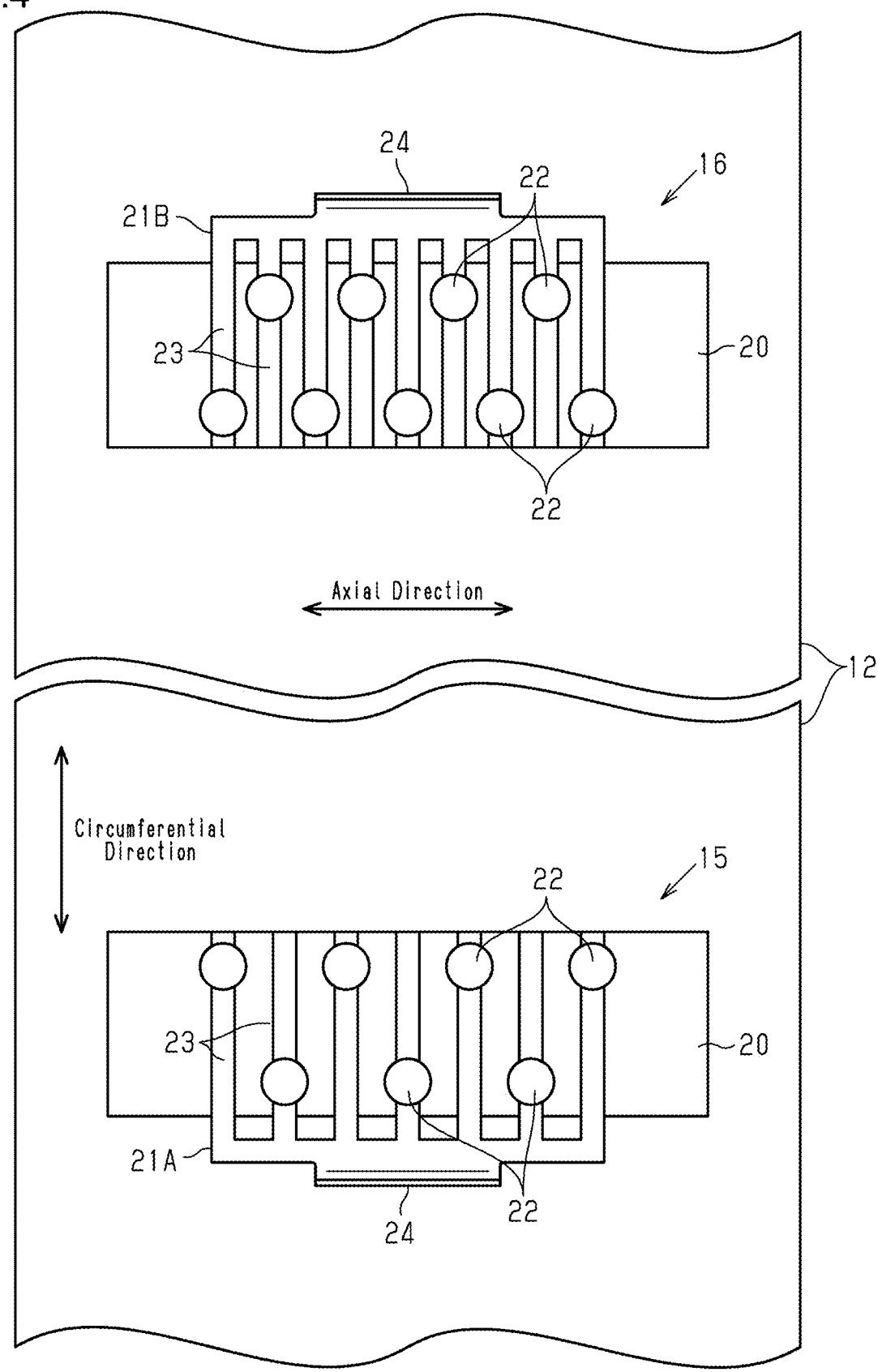
FIG. 4 is a developed view of the outer circumferential surface of an electrically heated catalyst device according to a third embodiment.

FIG. 4 is a developed view of the outer circumferential surface of the electrically heated catalyst device according to the present embodiment. In the electrically heated catalyst device of the present embodiment, surface electrode layers 20 that have the same dimensions and shape, and are made of the same material are used for the low-potential-side electrode 15 and the high-potential-side electrode 16. On the other hand, a comblike electrode layer 21A of the low-potential-side electrode 15 has a smaller number of wiring portions 23 than a comblike electrode layer 21B of the high-potential-side electrode 16. The wiring portions 23 in the comblike electrode layers 21A, 21B have the same dimensions and shape.

In the electrically heated catalyst device of the present embodiment, when current flows between the two electrodes, the current density in each wiring portion 23 in the comblike electrode layer 21A of the low-potential-side electrode 15 is higher than the current density in each wiring portion 23 in the comblike electrode layer 21B of the high-potential-side electrode 16. Thus, the Joule heat generated in each wiring portion 23 when current flows between the two electrodes is greater in the wiring portions 23 of the low-potential-side electrode 15 than in the wiring portions 23 of the high-potential-side electrode 16. Thus, even in the electrically heated catalyst device of the present embodiment, the low-potential-side electrode 15 is more likely to be melted and broken before the high-potential-side electrode 16 when an excessive current flows between the two electrodes. Therefore, the electrically heated catalyst device of the present embodiment also reduces the risk of occurrence of current leakage when an excessive current flows between the electrodes and the electrodes are melted and broken.

Fourth Embodiment

An electrically heated catalyst device according to a fourth embodiment will now be described with reference to FIG. 5.

Figure 5:
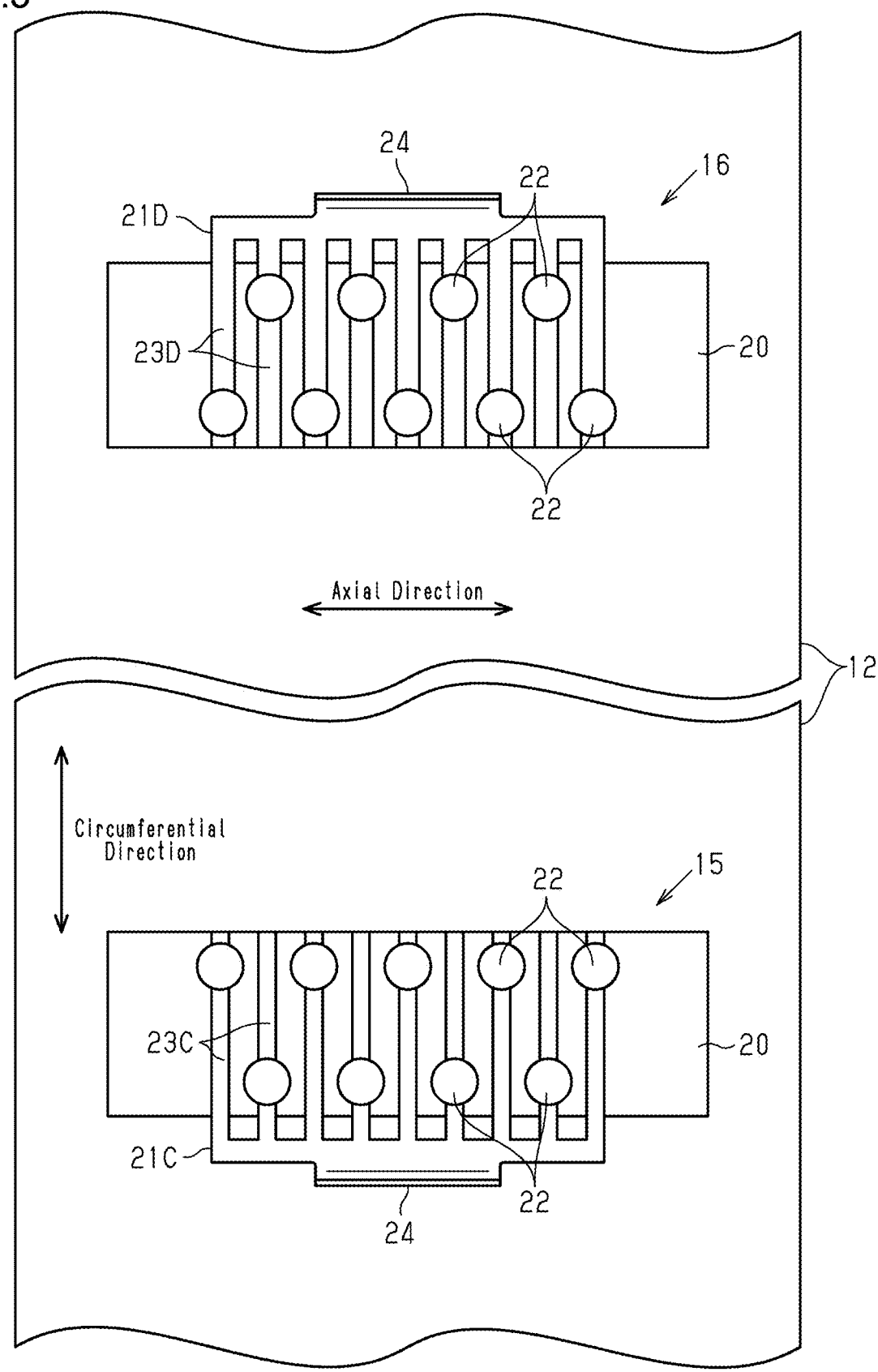
FIG. 5 is a developed view of the outer circumferential surface of an electrically heated catalyst device according to a fourth embodiment.

FIG. 5 is a developed view of the outer circumferential surface of the electrically heated catalyst device according to the present embodiment. In the electrically heated catalyst device of the present embodiment, surface electrode layers 20 that have the same dimensions and shape, and are made of the same material are used for the low-potential-side electrode 15 and the high-potential-side electrode 16. A comblike electrode layer 21C of the low-potential-side electrode 15 has the same number of wiring portions 23C as the number of wiring portions 23D of a comblike electrode layer 21D of the high-potential-side electrode 16. However, the width of each wiring portion 23C in the comblike electrode layer 21C of the low-potential-side electrode 15 is smaller than the width of each wiring portion 23D in the comblike electrode layer 21D of the high-potential-side electrode 16. Accordingly, each wiring portion 23C in the comblike electrode layer 21C of the low-potential-side electrode 15 has a smaller area in a cross section perpendicular to the extending direction than that of each wiring portion 23D in the comblike electrode layer 21D of the high-potential-side electrode 16. The comblike electrode layers 21C, 21D of the low-potential-side electrode 15 and the high-potential-side electrode 16 are made of metal thin plates that are made of the same material and have the same thickness.

In the electrically heated catalyst device of the present embodiment, when current flows between the two electrodes, the current density in each wiring portion 23C in the comblike electrode layer 21C of the low-potential-side electrode 15 is higher than the current density in each wiring portion 23D in the comblike electrode layer 21D of the high-potential-side electrode 16. Thus, the Joule heat generated in each of the wiring portions 23C, 23D when current flows between the two electrodes is greater in the wiring portions 23C of the low-potential-side electrode 15 than in the wiring portions 23D of the high-potential-side electrode 16. Thus, even in the electrically heated catalyst device of the present embodiment, the low-potential-side electrode 15 is more likely to be melted and broken before the high-potential-side electrode 16 when an excessive current flows between the two electrodes. Therefore, the electrically heated catalyst device of the present embodiment also reduces the risk of occurrence of current leakage when an excessive current flows between the electrodes and the electrodes are melted and broken.

Fifth Embodiment

An electrically heated catalyst device according to a fifth embodiment will now be described with reference to FIG. 6.

Figure 6:
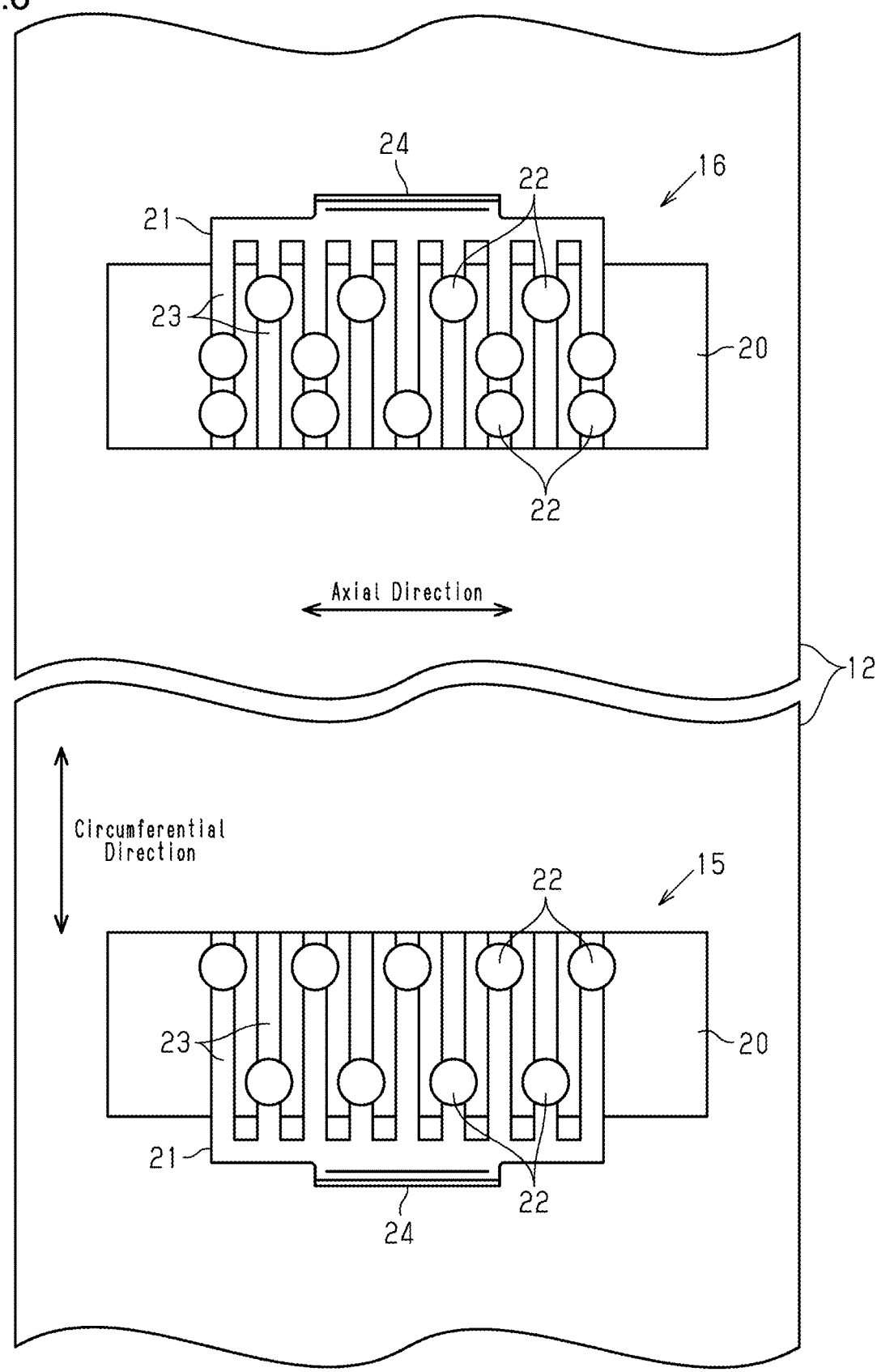
FIG. 6 is a developed view of the outer circumferential surface of an electrically heated catalyst device according to a fifth embodiment.

FIG. 6 is a developed view of the outer circumferential surface of the electrically heated catalyst device according to the present embodiment. In the electrically heated catalyst device of the present embodiment, surface electrode layers 20 that have the same dimensions and shape, and are made of the same material are used for the low-potential-side electrode 15 and the high-potential-side electrode 16. The comblike electrode layers 21 of the low-potential-side electrode 15 and the high-potential-side electrode 16 have the same dimensions and shape, and are made of the same material. However, the comblike electrode layer 21 of the low-potential-side electrode 15 is fixed to the surface electrode layer 20 by a smaller number of the fixing layers 22 than in the high-potential-side electrode 16.

In the electrically heated catalyst device of the present embodiment, when current flows between the two electrodes, the fixing layers 22 of the low-potential-side electrode 15 and the high-potential-side electrode 16 receive some of the Joule heat generated in the wiring portions 23. At this time, the amount of heat received by each fixing layer 22 from the wiring portions 23 is greater in the low-potential-side electrode 15 than in the high-potential-side electrode 16 since the number of the fixing layers 22 is smaller in the low-potential-side electrode 15 than in the high-potential-side electrode 16. In the electrically heated catalyst device of the present embodiment, when current that flows between the two electrodes is gradually increased from 0, the fixing layers 22 of the low-potential-side electrode 15 are first sections in which the temperature reaches the melting point of the material so that melting and breaking takes place, among all the sections in the low-potential-side electrode 15 and the high-potential-side electrode 16.

When any of the fixing layers 22 of the low-potential-side electrode 15 is melted and broken, the wiring portion 23 that has been fixed to the surface electrode layer 20 by the melted and broken fixing layer 22 peels off the surface electrode layer 20. The current density of the remaining wiring portions 23 is increased, accordingly. Thus, the remaining fixing layers 22 are likely to be melted and broken. When all the fixing layers 22 of the low-potential-side electrode 15 are melted and broken in this manner, the comblike electrode layer 21 separates from the surface electrode layer 20, so that the flow of current between the electrodes in the electrically heated catalyst device is interrupted.

Even in the electrically heated catalyst device of the present embodiment, the low-potential-side electrode 15 is more likely to be melted and broken before the high-potential-side electrode 16 when an excessive current flows between the two electrodes. Therefore, the electrically heated catalyst device of the present embodiment also reduces the risk of occurrence of current leakage when an excessive current flows between the electrodes and the electrodes are melted and broken.

Sixth Embodiment

An electrically heated catalyst device according to a sixth embodiment will now be described with reference to FIG. 7.

Figure 7:
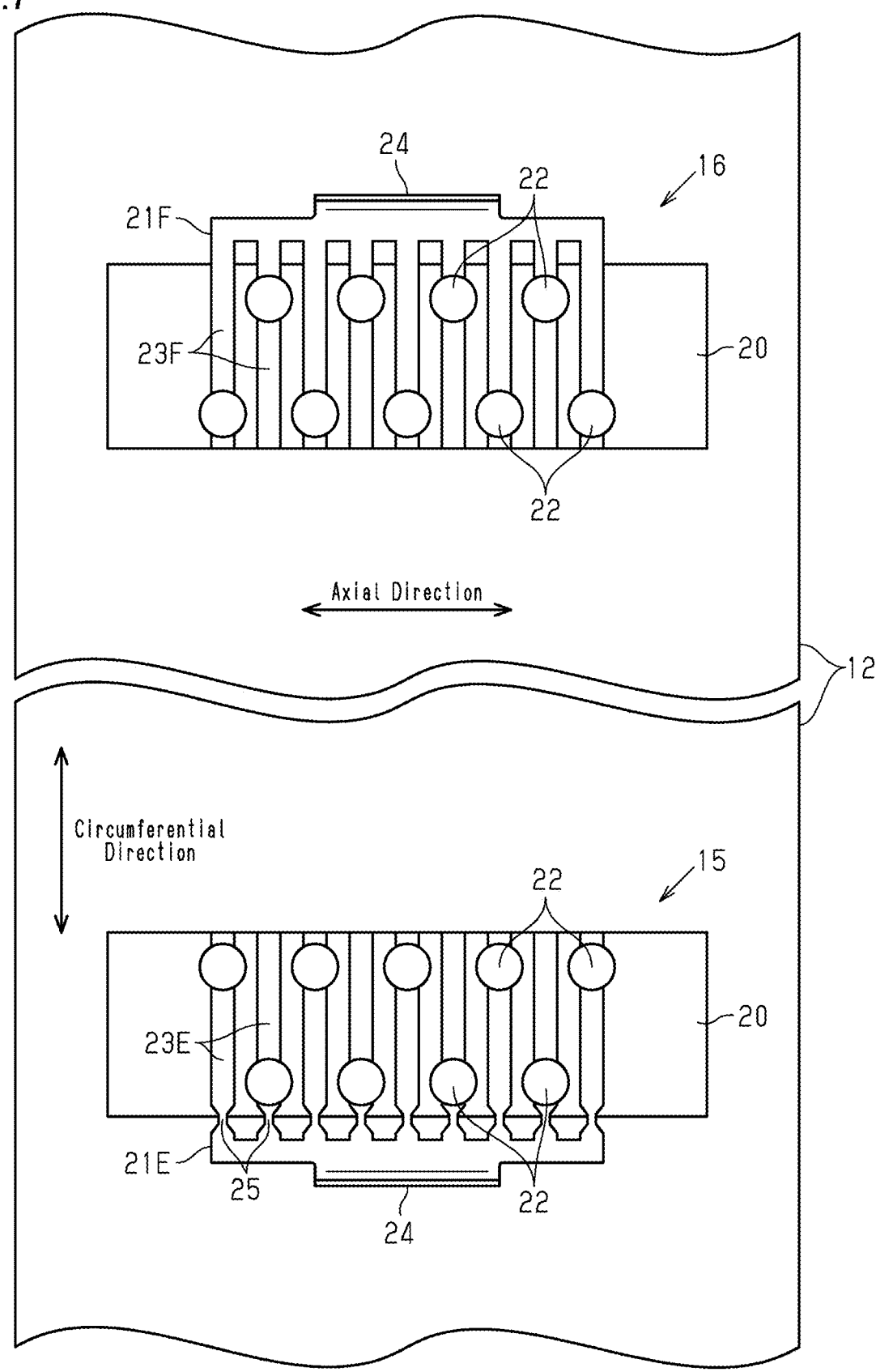
FIG. 7 is a developed view of the outer circumferential surface of an electrically heated catalyst device according to a sixth embodiment.

FIG. 7 is a developed view of the outer circumferential surface of the electrically heated catalyst device according to the present embodiment. In the electrically heated catalyst device of the present embodiment, surface electrode layers 20 that have the same dimensions and shape, and are made of the same material are used for the low-potential-side electrode 15 and the high-potential-side electrode 16. On the other hand, comblike electrode layers 21E, 21F of the low-potential-side electrode 15 and the high-potential-side electrode 16 are made of the same material but have different shapes. That is, the comblike electrode layer 21F of the high-potential-side electrode 16 has wiring portions 23F each having a constant width along the entire length. In contrast, the comblike electrode layer 21E of the low-potential-side electrode 15 has wiring portions 23E each having a narrow section 25 in the extending direction. The narrow section 25 has a smaller width than the remaining sections. The position of the narrow section 25 in each wiring portion 23E is closer to the terminal portion 24 of the low-potential-side electrode 15 than the section of the wiring portion 23E that is fixed to the surface electrode layer 20 by the fixing layer 22.

The current density in each narrow section 25 when current flows between the two electrodes of the electrically heated catalyst device is higher than in the sections in the wiring portion 23E other than the narrow section 25 in the low-potential-side electrode 15, and than in the wiring portions 23F of the high-potential-side electrode 16. In the electrically heated catalyst device of the present embodiment, the narrow sections 25 are first sections in which the temperature reaches the melting point of the material so that meting and breaking takes place, among all the sections in the low-potential-side electrode 15 and the high-potential-side electrode 16. When the narrow section 25 of any wiring portion 23E of the low-potential-side electrode 15 is melted and broken, the current density of the narrow sections 25 of the remaining wiring portions 23E increases, so that the narrow sections 25 are melted and broken in succession. When the narrow sections 25 of all the wiring portions 23E are melted and broken, the flow of current between the electrodes is interrupted.

Even in the electrically heated catalyst device of the present embodiment, the low-potential-side electrode 15 is more likely to be melted and broken before the high-potential-side electrode 16 when an excessive current flows between the two electrodes. Therefore, the electrically heated catalyst device of the present embodiment also reduces the risk of occurrence of current leakage when an excessive current flows between the electrodes and the electrodes are melted and broken.

The above-described embodiments may be modified as follows. The above-described embodiments and the following modifications can be combined as long as the combined modifications remain technically consistent with each other.

In the electrically heated catalyst device of the first embodiment, the surface electrode layer 20A of the low-potential-side electrode 15 is configured such that the contact area with the outer circumferential surface of the catalyst support 12 is smaller than that of the surface electrode layer 20B of the high-potential-side electrode 16. The contact areas of the surface electrode layers 20A, 20B with the outer circumferential surface of the catalyst support 12 may be equal to each other, and the thickness of the surface electrode layer 20A may be smaller than that of the surface electrode layer 20B. Even in this case, when current flows between the two electrodes, the current density in the surface electrode layer 20A of the low-potential-side electrode 15 is higher than that in the surface electrode layer 20B of the high-potential-side electrode 16. Thus, the low-potential-side electrode 15 is more likely to be melted and broken before the high-potential-side electrode 16 when an excessive current flows between the two electrodes. Alternatively, the thickness and the contact area with the outer circumferential surface of the catalyst support 12 of the surface electrode layer 20A of the low-potential-side electrode 15 may be smaller than those of the surface electrode layer 20B of the high-potential-side electrode 16. That is, if the volume of the surface electrode layer 20A is smaller than that of the surface electrode layer 20B, the current density in the surface electrode layer 20A is higher than that in the surface electrode layer 20B when current flows between the two electrodes. Thus, the low-potential-side electrode 15 is more likely to be melted and broken before the high-potential-side electrode 16 when an excessive current flows between the two electrodes.

In the electrically heated catalyst device of the fourth embodiment, the width of the wiring portions 23C of the low-potential-side electrode 15 is smaller than the width of the wiring portions 23D of the high-potential-side electrode 16. Instead of reducing the width, the thickness of the wiring portions 23C of the low-potential-side electrode 15 may be smaller than the thickness of the wiring portions 23D of the high-potential-side electrode 16. In this case also, the current density in the wiring portions 23C of the low-potential-side electrode 15 is higher than the current density in the wiring portions 23E of the high-potential-side electrode 16 when current flows between the two electrodes. Thus, even in this case, the low-potential-side electrode 15 is more likely to be melted and broken before the high-potential-side electrode 16 when an excessive current flows between the two electrodes of the electrically heated catalyst device. The width and the thickness of the wiring portions 23C of the low-potential-side electrode 15 both may be smaller than those of the wiring portions 23D of the high-potential-side electrode 16. That is, it suffices if each wiring portion 23C of the low-potential-side electrode 15 has a smaller area in a cross section perpendicular to the extending direction than that of each wiring portion 23D of the high-potential-side electrode 16. With this configuration, the wiring portions 23C of the low-potential-side electrode 15 are more likely to be melted and broken before the wiring portions 23E of the high-potential-side electrode 16 when an excessive current flows between the two electrodes. Likewise, regarding the narrow sections 25 in the wiring portions 23E of the low-potential-side electrode 15 in the electrically heated catalyst device of the sixth embodiment, it suffices if each narrow section 25 has a smaller area in a cross section perpendicular to the extending direction of the wiring portion 23E than that of the remaining sections of the wiring portion 23E and that of each wiring portion 23F of the high-potential-side electrode 16.

Instead of the wiring portions 23C of the low-potential-side electrode 15, the terminal portion 24 of the low-potential-side electrode 15 may have a section that has a smaller area in a cross section perpendicular to the direction of the current flowing between the two electrodes than the remaining sections of the terminal portion 24 and the terminal portion 24 of the high-potential-side electrode 16. In this case, the current density is locally increased in the section having the reduced area in the cross section when current flows between the two electrodes. Thus, in this case, the terminal portion 24 of the low-potential-side electrode 15 is likely to be melted and broken first when an excessive current flows between the two electrodes of the electrically heated catalyst device. This configuration therefore reduces the risk of occurrence of current leakage to the exhaust pipe 11.

It is possible to combine two or more of the structures according to the above-described embodiments and modifications, which allow the low-potential-side electrode 15 to be more likely to be melted and broken before the high-potential-side electrode 16 when an excessive current flows between the two electrodes.

An example assumes that the current value between the low-potential-side electrode 15 and the high-potential-side electrode 16 is gradually increased from 0. In this case, the current value between the two electrodes is referred to as an electrode fusing current value when, in each of the low-potential-side electrode 15 and the high-potential-side electrode 16, the temperature of any section of the electrode first reaches the melting point of the material. If the electrically heated catalyst device is structured such that the electrode fusing current value of the low-potential-side electrode 15 is lower than that of the high-potential-side electrode 16, any configuration other than those described above reduces the risk of occurrence of current leakage due to melting and breaking of the electrodes when an excessive current flows between the electrodes of the electrically heated catalyst device.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described device, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An electrically heated catalyst device configured to purify exhaust gas of an internal combustion engine mounted on a vehicle, the device comprising:
   a catalyst support that is arranged inside an exhaust pipe of the internal combustion engine, and is made of an electroconductive material;
   a low-potential-side electrode that is fixed to an outer circumferential surface of the catalyst support, and is configured to be connected to a low-potential-side terminal of a vehicle on-board power source when the electrically heated catalyst device is assembled with the vehicle; and
   a high-potential-side electrode that is fixed to the outer circumferential surface of the catalyst support, and is configured to be connected to a high-potential-side terminal of the vehicle on-board power source when the electrically heated catalyst device is assembled with the internal combustion engine, wherein
   in a case in which a current value between two electrodes, which are the low-potential-side electrode and the high-potential-side electrode, is gradually increased from 0, the current value between the two electrodes is referred to as an electrode fusing current value when, in each of the low-potential-side electrode and the high-potential-side electrode, a temperature of any section of the electrode first reaches a melting point of a material of the electrode, and
   the low-potential-side electrode is configured to have a lower electrode fusing current value than the high-potential-side electrode.

2. The electrically heated catalyst device according to claim 1, wherein
   each of the low-potential-side electrode and the high-potential-side electrode includes:
   a comblike electrode layer that includes wiring portions extending parallel with each other;
   a film-shaped surface electrode layer, which is arranged between the wiring portions and the outer circumferential surface of the catalyst support; and
   a fixing layer fixed to a surface of the surface electrode layer with the wiring portions in between,
   the surface electrode layers each include a contact area in which the surface electrode layer is in contact with the outer circumferential surface of the catalyst support, and
   the surface electrode layer of the low-potential-side electrode is configured such that the contact area with the outer circumferential surface of the catalyst support is smaller than that of the surface electrode layer of the high-potential-side electrode.

3. The electrically heated catalyst device according to claim 1, wherein
   each of the low-potential-side electrode and the high-potential-side electrode includes:
   a comblike electrode layer that includes wiring portions extending parallel with each other;
   a film-shaped surface electrode layer, which is arranged between the comblike electrode layer and the outer circumferential surface of the catalyst support; and
   a fixing layer fixed to a surface of the surface electrode layer with the wiring portions in between, and
   the surface electrode layer of the low-potential-side electrode is made of a material having a higher volume resistivity than a material of the surface electrode layer of the high-potential-side electrode.

4. The electrically heated catalyst device according to claim 1, wherein
   each of the low-potential-side electrode and the high-potential-side electrode includes:
   a comblike electrode layer that includes wiring portions extending parallel with each other;

a film-shaped surface electrode layer, which is arranged between the comblike electrode layer and the outer circumferential surface of the catalyst support; and a fixing layer fixed to a surface of the surface electrode layer with the wiring portions in between, and a number of the wiring portions provided in the comblike electrode layer of the low-potential-side electrode is smaller than a number of the wiring portions provided in the comblike electrode layer of the high-potential-side electrode.

5. The electrically heated catalyst device according to claim 1, wherein each of the low-potential-side electrode and the high-potential-side electrode includes:

a comblike electrode layer that includes wiring portions extending parallel with each other;

a film-shaped surface electrode layer, which is arranged between the comblike electrode layer and the outer circumferential surface of the catalyst support; and a fixing layer fixed to a surface of the surface electrode layer with the wiring portions in between, and each wiring portion in the comblike electrode layer of the low-potential-side electrode has a smaller area in a cross section perpendicular to an extending direction than that of each wiring portion in the comblike electrode layer of the high-potential-side electrode.

6. The electrically heated catalyst device according to claim 1, wherein each of the low-potential-side electrode and the high-potential-side electrode includes:

a comblike electrode layer that includes wiring portions extending parallel with each other;

a film-shaped surface electrode layer, which is arranged between the comblike electrode layer and the outer circumferential surface of the catalyst support; and a fixing layer fixed to a surface of the surface electrode layer with the wiring portions in between, and a number of the fixing layers provided in the low-potential-side electrode is smaller than a number of the fixing layers provided in the high-potential-side electrode.

* * * * *